United States Patent Office 2,778,683
Patented Jan. 22, 1957

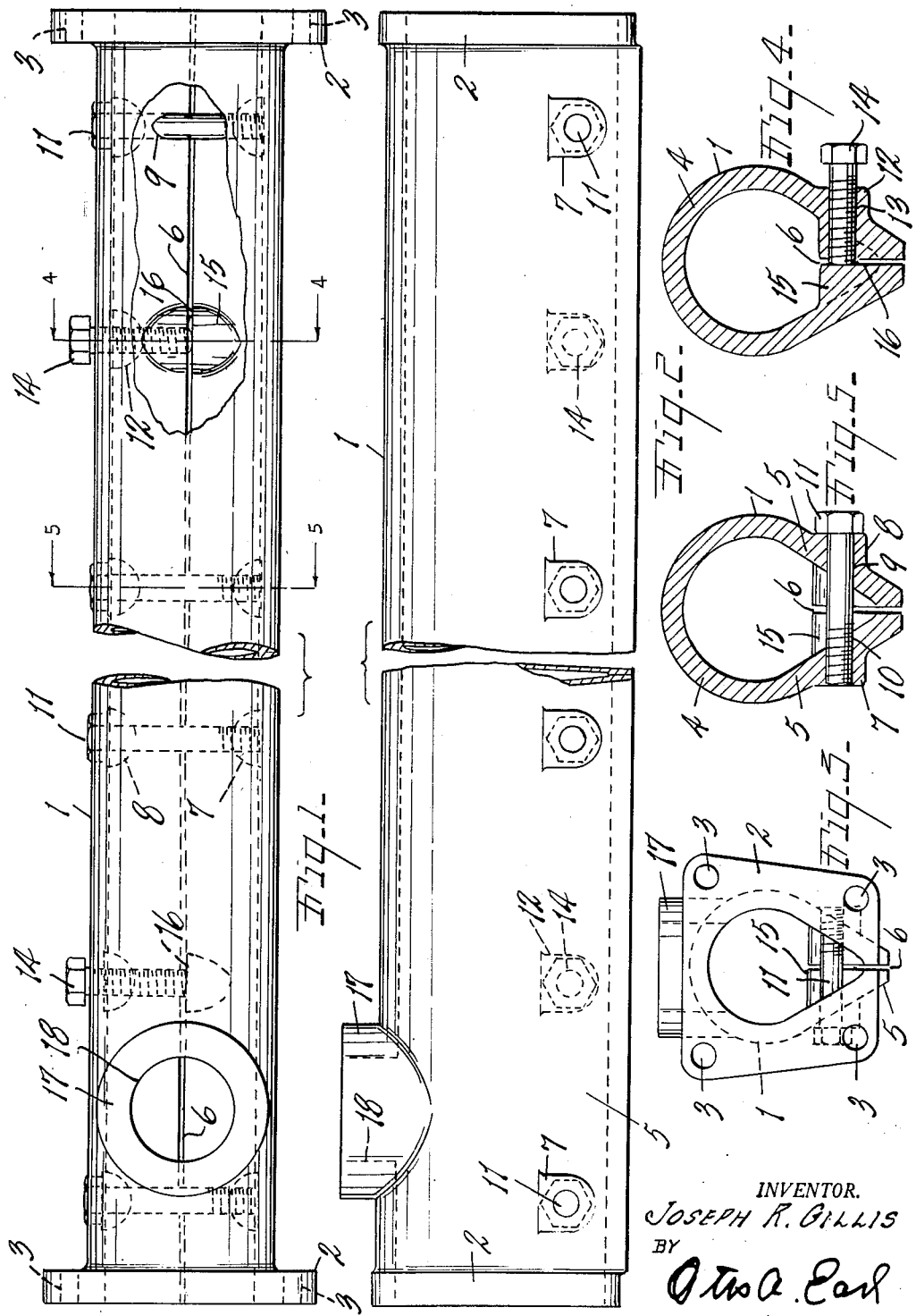

2,778,683
STEAM DISTRIBUTOR TUBE

Joseph R. Gillis, Kalamazoo, Mich.; Esther M. Gillis, administratrix of said Joseph R. Gillis, deceased Application August 10, 1953, Serial No. 373,137

4 Claims. (Cl. 299—106)

This invention relates to improvements in steam distributor tube. The principal objects of this invention are:

First, to provide a tube with a slot therein and means for accurately controlling the width of the slot to regulate escape of live steam in a sheet through the slot.

Second, to provide a slotted steam distributor tube that is readily assembled in sections and supplied with steam at different points along the sectional tube.

Third, to provide a slotted steam distributor tube that is capable of withstanding wide temperature changes while maintaining the width of the slot.

Other objects and advantages of the invention will be apparent from a consideration of the following description and claims. The drawings illustrate a highly practical form of the tube.

Fig. 1 is a fragmentary top plan view of the tube, partially broken away, to illustrate the interior construction thereof.

Fig. 2 is a side elevational view of the tube.

Fig. 3 is an end elevational view of the tube.

Fig. 4 is a transverse cross-sectional view taken along the plane of the line 4—4 in Fig. 1.

Fig. 5 is a transverse cross-sectional view taken along the plane of the line 5—5 in Fig. 1.

The steam distributor tube disclosed herein is well adapted for use in apparatus such as that disclosed and claimed in my Patent 2,627,667, dated February 10, 1953, for Methods and Apparatus for Drying Inks, and in other apparatus where it is desired to distribute a thin sheet of extremely high temperature steam. The tube is desirably formed as a casting of high temperature and rust resistant metal. The tube consists of a hollow tubular body 1 having transversely extending end flanges 2. The flanges are drilled as at 3 to receive clamping bolts so that end closure plates (not illustrated) may be clamped to the ends of the tube or section of the tube may be joined together to provide a longer tube.

As is most readily apparent from Figs. 3, 4 and 5 the tube is rounded or semi-cylindrical in its upper side as at 4 and tapers downwardly in converging flat sides 5 on its under side. The underside of the tube is slotted from end to end as at 6 and the width of the slot is exaggerated in the drawings to more clearly show its position. In actual use the slot is closed to a very small opening. Formed along the outer sides of the tapering underside 5 are a series of bosses 7 and 8 positioned on opposite sides of the tube at longitudinally spaced positions along the tube. The bosses 8 are transversely drilled or apertured as at 9 and the bosses 7 have tapped apertures 10 formed therein in alignment with the apertures 9. Clamp screws 11 have threaded ends engaged in the tapped apertures 10 and heads engaged with the bosses 8 to clamp the opposite sides of the tube together to narrow the slot 6.

Intermediate bosses 12 are formed on one side of the tube between the bosses 8 and are transversely drilled and tapped as at 13 to receive spreader screws 14. Internal bosses 15 are formed on the inside of the tube opposite the intermediate bosses 12 and have lateral faces 16 against which the inner ends of the screws 14 bear to widen the slot 6. The screws 11 tend to close the slot while the screws 14 tend to open the slot. By proper adjustment of the screws the width of the slot can be accurately controlled and the two sets of screws act as set screws for each other, in that they jam the sides of the tube against the threads of the other set of screws to prevent loosening of the screws.

In order to connect a source of steam supply to the tubes each tube is provided with an upstanding boss 17 on the top near one end and when it is desired to attach a supply pipe to the tube this boss is drilled as at 18. When no connection is to be made directly to the tube as in the case of sectional tubes the boss 17 may be left undrilled.

The tube is described as long-lived and capable of withstanding the high temperatures of superheated steam. The adjusted width of the slot 6 is maintained accurately through alternate hot operating periods and relatively cold shut-down periods.

Having thus described my invention, what I claim to be new and desire to secure by Letters Patent is:

1. A steam distributing tube comprising, a hollow tubular casting with parallel end flanges, said end flanges having bolt holes therein for the attachment of other flanges and plates thereto, said tube being rounded on its upper half and tapering downwardly on its under half in inner and outer cross section and having a longitudinally extending slot formed through said tapered underside from the interior of the tube to the bottom edge thereof, external bosses on said tapered sides at longitudinally spaced points along said tube, the bosses on one side being tapped and the bosses on the other side having aligned holes therein receiving screws acting to clamp the sides of said slot together, intermediate bosses formed on one side of said tube between said first bosses and having tapped holes therein receiving spreader screws, internal bosses on the inside of said tube opposite said intermediate bosses and having surfaces engaged by the ends of said spreader screws to spread the sides of said slot, and a top boss on one end of said tube adapted to be drilled to form a supply opening into said tube, said screws being generally parallel and perpendicular to said slot, said slot being formed immediately between the adjacent edges of said casting.

2. A steam distributing tube comprising, a hollow tubular casting with parallel end flanges, said tube having a longitudinally extending slot formed through its underside from the interior of the tube to the bottom edge thereof, external bosses on the sides at longitudinally spaced points along said tube, the bosses on one side being tapped and the bosses on the other side having aligned holes therein receiving screws acting to clamp the sides of said slot together, intermediate bosses formed on one side of said tube between said first bosses and having tapped holes therein receiving spreader screws, internal bosses on the inside of said tube opposite said intermediate bosses and having surfaces engaged by the ends of said spreader screws to spread the sides of said slot, and a top boss on one end of said tube adapted to be drilled to form a supply opening into said tube, said screws being generally parallel and perpendicular to said slot, said slot being formed immediately between the adjacent edges of said casting.

3. A steam distributing tube comprising, a hollow tubular casting with parallel end flanges, said tube being rounded on its upper half and tapering downwardly on its under half in cross section and having a longitudinally extending slot formed through said tapered underside from the interior of the tube to the bottom edge thereof, external bosses on one side of said tube at longitudinally spaced points along said tube, the other of said sides having tapped holes therein and the bosses having aligned holes therein receiving screws threaded into said tapped holes and acting to clamp the sides of said slot together, intermediate bosses formed on one side of said tube longitudinally between said first bosses and having tapped holes therein receiving spreader screws, and internal surfaces on said tube engaged by the ends of said spreader screws to spread the sides of said slot, said screws being generally parallel and perpendicular to said slot, said slot being formed immediately between the adjacent edges of said casting.

4. A steam distributing tube comprising, a hollow tubular casting with parallel end flanges, said tube having a longitudinally extending slot formed through its underside from the interior of the tube to the bottom edge thereof, holes formed in one side of said tube at longitudinally spaced points along said tube, the other side having tapped holes therein aligned with said first holes and receiving screws acting to clamp the sides of said slot together, intermediate tapped holes in one side of said tube receiving spreader screws, and internal surfaces engaged by the ends of said spreader screws to spread the sides of said slot, said screws being generally parallel and perpendicular to said slot, said slot being formed immediately between the adjacent edges of said casting.

References Cited in the file of this patent

UNITED STATES PATENTS

| | | |
|---|---|---|
| 366,321 | Jarecki | July 12, 1887 |
| 579,043 | Cloudman | Mar. 16, 1897 |
| 768,095 | Twist | Aug. 23, 1904 |
| 1,434,625 | Olsen | Nov. 7, 1922 |
| 1,885,747 | Maurer | Nov. 1, 1932 |
| 1,919,365 | Gilsenan | July 25, 1933 |
| 2,139,628 | Terry | Dec. 6, 1938 |

FOREIGN PATENTS

| | | |
|---|---|---|
| 1,016,140 | France | Aug. 20, 1952 |